United States Patent [19]

Koksbang et al.

[11] Patent Number: 5,262,254
[45] Date of Patent: Nov. 16, 1993

[54] POSITIVE ELECTRODE FOR RECHARGEABLE LITHIUM BATTERIES

[75] Inventors: Rene Koksbang, San Jose; Dale R. Shackle, Morgan Hill, both of Calif.

[73] Assignee: Valence Technology, Inc., San Jose, Calif.

[21] Appl. No.: 40,057

[22] Filed: Mar. 30, 1993

[51] Int. Cl.$^5$ ............................................. H01M 4/66
[52] U.S. Cl. ...................................... 429/192; 429/209
[58] Field of Search ............... 429/192, 194, 191, 218, 429/216, 209, 212, 232, 245

[56] References Cited

U.S. PATENT DOCUMENTS

| | | |
|---|---|---|
| 4,569,734 | 2/1986 | Naarmann et al. . |
| 4,608,322 | 8/1986 | Howard et al. . |
| 4,640,749 | 2/1987 | Naarmann et al. . |
| 4,812,376 | 3/1989 | Rudolph . |
| 4,818,646 | 4/1989 | Takakubo et al. . |
| 4,830,939 | 5/1989 | Lee et al. . |
| 4,925,751 | 5/1990 | Shackle et al. ..................... 429/191 |
| 4,987,042 | 1/1991 | Jones et al. . |
| 5,108,573 | 4/1992 | Rubinstein et al. . |
| 5,166,008 | 11/1992 | Tomida et al. ................... 429/192 K |

OTHER PUBLICATIONS

M. G. Kanatzidis, "Conductive Polymers", Dec. 3, 1990, Chemical and Engineering News, pp. 36–54.

Primary Examiner—Anthony Skapars
Attorney, Agent, or Firm—Linda M. Deschire

[57] ABSTRACT

In an electrochemical lithium cell having an active metal negative electrode, a positive electrode and an electrolyte separator there is provided a layer between the current collector and the positive electrode, which layer comprises a carbon-based material which is a conductor of electrons and which restricts penetration of electrolyte therethrough to prevent corrosion of the positive electrode.

8 Claims, 2 Drawing Sheets

POLYANILINE

POLYPYRROLE

POLYTHIOPHENE

POLYPHENYLENE

POSITIVE ELECTRODE FOR RECHARGEABLE LITHIUM BATTERIES

FIELD OF THE INVENTION

This invention relates to electrochemical batteries, and more particularly, to improved cathode current collector assemblies for such batteries.

BACKGROUND OF THE INVENTION

The cathode current collector of a battery serves several functions. One of the functions is to conduct the flow of electrons between the active material of the electrode and the battery terminals. Cathode current collectors may also provide some support for the cathode active material. Cathode current collector materials must maintain chemical stability and mechanical integrity in corrosive electrolytes throughout cell life. However, this is often a problem, since the availability of materials capable of meeting such requirements is limited. Often battery operating conditions are such that corrosion of the current collector occurs.

Corrosion of the metal current collectors, particularly at the cathode (positive electrode), is a problem. A metal foil current collector, such as nickel, is electrochemically dissolved. This is a problem especially if very thin current collectors are used. Corrosion often leads to loss of contact, electronic isolation and, consequently, to poor battery performance.

Therefore, what is needed is a cell construction and method of operation which overcomes problems with corrosion in order to prevent degradation of cell performance.

SUMMARY OF THE INVENTION

According to the invention, there is provided an electrochemical cell which has a positive electrode (cathode) current collector which comprises an electron conductive metal in the form of a solid body having a major surface facing the cathode active material. A layer is disposed between the major surface of the cathode current collector and the active material of the cathode. Preferably, the layer is a coating of carbon-based material carried on the major surface of the current collector. Electrolytic components penetrate the cathode, but do not penetrate the coating of carbon-based material. The carbon-based material contains one or more conductive polymers. These polymers are characterized by an ability to conduct electrons to the current collector. The conductive polymers, polyphenylene, polyaniline, polypyrrole and polythiophene are characterized by the ability to be used in conjunction with a metal surface, such as a current collector, as a layer or coating of a thickness sufficient to restrict penetration of electrolyte components therethrough.

Accordingly, objects, features and advantages of the present invention are to provide an improved electrochemical battery based on lithium which maintains its integrity over a prolonged life-cycle as compared to presently used batteries; and to provide a conductive layer between cathode active material and a current collector which prevents corrosion of the metal current collector.

These and other objects, features and advantages will become apparent from the following description of the preferred embodiments, appended claims and accompanying drawings.

DETAILED DESCRIPTION OF THE PREFERRED EMBODIMENTS

Figure 1:
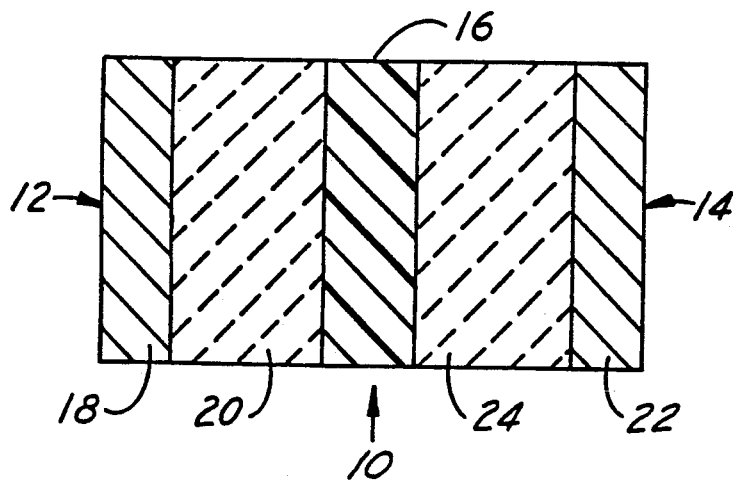
FIG. 1 is an illustration of a cross-section of a conventional (prior art) lithium battery or cell.

As shown in FIG. 1, a conventional (prior art) electrochemical cell or battery 10 has a negative electrode side 12, a positive electrode side 14, and an electrolyte separator 16 therebetween. In accordance with common usage, a battery may consist of one cell or multiple cells. The negative electrode side 12 is the anode during discharge, and the positive electrode side 14 is the cathode during discharge. The negative electrode side 12 includes current collector 18, typically of nickel, iron, aluminum, stainless steel, and/or copper foil, and a body of negative electrode active material 20. The negative electrode active material 20 consists of lithium, or compounds and alloys thereof, and is sometimes simply referred to as the negative electrode.

The positive electrode side 14 includes current collector 22, typically of aluminum, nickel, iron, stainless steel, and/or copper, and a body of positive electrode active material 24 which is usually different than the negative electrode active material 20. The positive electrode active material 24 is sometimes simply referred to as the positive electrode. Typical positive electrode active materials include transition metal chalcogen compounds having a reversible lithium insertion ability, wherein the transition metal is at least one selected from the group consisting of Ti, V, Cr, Mn, Fe, Nb, Mo, Ta and W, and the chalcogen is at least one selected from the group consisting of 0, S and Se.

The separator 16 is typically a solid electrolyte, electrolyte separator. A suitable electrolyte separator is described in U.S. Pat. No. 4,830,939 incorporated herein by reference. The electrolyte separator is a solid matrix containing an ionically conductive liquid with an alkali metal salt where the liquid is an aprotic polar solvent.

A problem associated with rechargeable lithium batteries is the corrosion of the metal current collector 22 on the cathode. At the high potentials, which are reached at the end of charge, namely, 3.0–3.5 V for $V_6O_{13}$-based cathodes and 4.0–4.5 V for Li-Mn-O-based cathodes, even nickel foil is electrochemically dissolved. This limits the useful life of such batteries, especially if very thin current collectors 22 are used.

Figure 2:
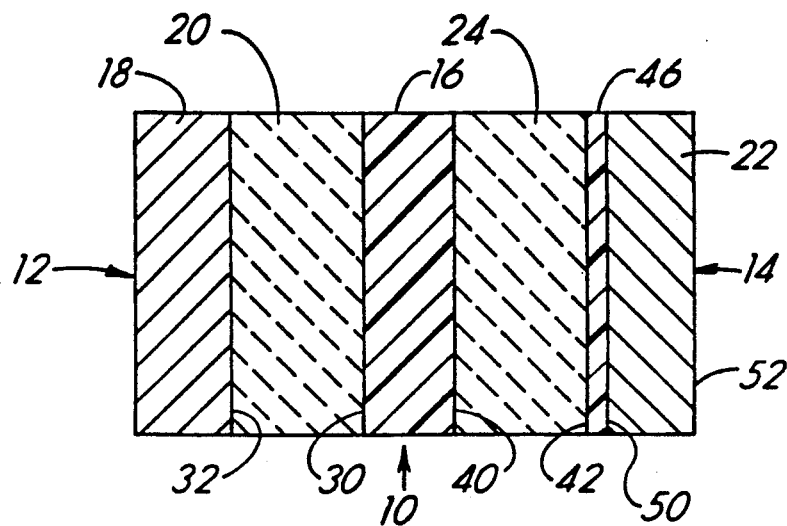
FIG. 2 is an illustration of a cross-section of a lithium battery or cell having a carbon-based layer comprising electrically conductive polymer between a current collector and a positive electrode active material.
Figure 3:
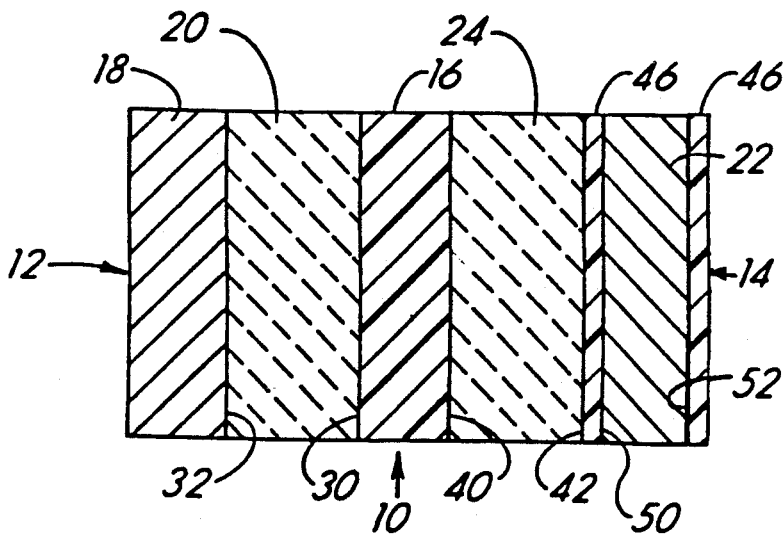
FIG. 3 is an illustration similar to FIG. 2 and having a layer on both sides of the current collector.

Such problems are obviated in accordance with the invention by the use of certain carbon-based materials, namely, redox active conductive polymers such as polypyrrole, polythiophene, polyphenylene and polyaniline. Such conductive polymers are electrochemically stable in oxidation, i.e. at high potentials. As shown in FIG. 2, the body of the negative electrode 20 has first and second opposed major surfaces 30, 32. Such surfaces are typically smooth as formed. The first surface 30 faces electrolyte separator 16 and the second surface 32 faces current collector 18. The body of the positive electrode 24 has first and second opposed major surfaces 40,42. The first surface 40 faces the electrolyte separator 16 and the second surface 42 faces current collector 22. The conductive coating of carbon-based material 46 is disposed between the second surface 42 of the positive electrode 24 and the first surface 50 of current collector 22. Preferably, coating 46 is carried on the current collector 22. If desired, both surfaces 50,52 of current collector 22 may be coated if, for example, the coating is applied by dipping the current collector 22 in a solution containing the carbon-based material (FIG. 3). The coating 46 is both electrochemically stable and electronically conductive. One carbon-based (organic) material which fulfills such requirements includes organic redox active conductive polymers such as polypyrrole, polythiophene, polyphenylene and polyaniline which also may react with lithium. These reactions are characterized by being reversible and the electric properties of the materials allow fast transport of electrons across the interface layer. Apart from the electrical requirements, the only other requirement is that the layer be at least a monolayer of molecules, and is preferably dense and impermeable to the components which corrode the current collector thereby preventing reaction between the current collector and the positive electrode active material. The coating desirably has a thickness of 0.1 millimeters or more. The conductive polymers are applied as such a coating 46 chemically or electrochemically formed on at least one side of the metal current collector 22. As stated, the coating 46 must be at least a monolayer of molecules, dense and impermeable to the electrolyte. The metal current collector 22 is thus protected and will not dissolve during charge nor will the protective coating 46 be damaged.

The protective conductive coating on the current collector is preferably in the form of a sheet or foil, that is, a conducting polymer foil. Alternatively, such coating may be in the form of a composite sheet or foil, that is, a composite foil of a binder and a conducting phase comprising the electrically conductive polymer. In either event, the conducting polymer desirably has a conductivity of $10^{-4}$ Siemens/cm (S/cm) and preferably $10^{-3}$ Siemens/cm or higher. It is preferred that the conductivity of the polymers not limit the rate capabilities of the battery system. That is, the conductivity should probably not be much lower than the conductivity of the composite electrodes and electrolytes, that is, greater than 0.001 and preferably in the range of 0.001-0.01 S/cm. When the coating is an electrically conductive polymer, such polymers are also known to be capable of transporting positive ions such as Li. U.S. Pat. No. 4,640,749, assigned to BASF demonstrates a method for forming a self-supporting sheet of conductive copolymers of pyrroles and is incorporated herein by reference in its entirety. Those skilled in the art will appreciate that composite polymer (plastic) sheets are able to be shaped into a suitable form to provide a layer, or be directly applied as a coating. General methods for forming composite polymer (plastic) films by application from solution or painting onto a surface, and then mechanical or hot-pressing are described in U.S. Pat. No. 4,812,376 incorporated herein by reference in its entirety.

The basic properties of redox active conducting polymers useful in the invention are generally described by Mercouri G. Kanatzidis in an article entitled "Conductive Polymers", published in the Dec. 3, 1990 issue of Chemical and Engineering News, pp 36-54. Basic exemplary methods for preparing and applying such conductive polymers are also described in Kanatzidis' article. Properties and methods pertinent to the invention are described below.

Figure 4:
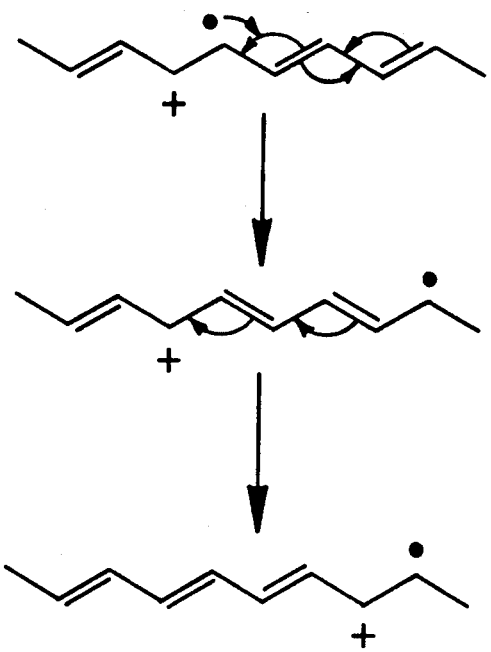
FIG. 4 illustrates movement of cations (+) and electrons (.) along a conductive polymer chain of single and double bonds.

All conductive polymers are characterized by pi-conjugated systems which are single and double bonds alternating along a polymer chain. The alternating single and double bonds give rise to certain unique electrical properties. The movement of an electron and a corresponding positively charged species along the polymer chain is illustrated in FIG. 4. The ability to transport charged species along the polymer chain and the ability to conduct an electron along the polymer chain makes such conductive polymers uniquely suited to ionic transport and electronic transport functions required at the interface between the metal cathode current collector and the active material of the cathode, while at the same time, preventing direct reaction between the active material and the current collector. It should be noted that the conductivity of the polymers varies widely up to about 10,000 Siemens/cm (S/cm). Doping materials include lithium, halogens and chlorine oxides.

Figure 5:
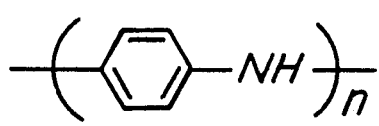
FIGS. 5–8 show the basic unit of conductive polymers of polyaniline (5), polypyrrole (6), polythiophene (7), and polyphenylene (8).

Polyaniline, FIG. 5, consists of about 1,000 or more repeating units. Polyaniline may exist in several oxidation states with electrical conductivity varying from $10^{-11}$ S/cm, to more than 10 S/cm. Polyaniline has a wide range of attractive electrical and electrochemical properties and exhibits good stability.

The electrically conductive form of polyaniline is easily synthesized by electrochemical or chemical oxidation of aniline in aqueous acidic media using common oxidants. Doping is initially accomplished by dipping the films in acid or passing the gaseous acid over them. Doping of polyaniline to produce an electronic conductor should not be confused with protonic conductivity. Proton containing polymers having H+ must be avoided and such polymers can be made with Li+ replacing H+. For conductive polymers, common doping materials include Li, K, Na, B, F and BF.

Figure 6:
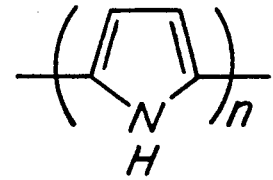
Figure 7:
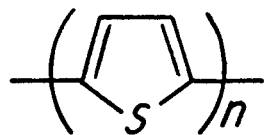

Conductive polymers such as polypyrrole (FIG. 6) and polythiophene (FIG. 7) are formed by chemical and electrochemical methods. The basic procedure includes forming solutions containing pyrrole or thiophene and a lithium salt. A foil may then be coated by slowly passing the foil through the solution and simultaneously applying a voltage or current between a counter-electrode in the solution and the foil, as the working electrode. Although the foil being coated may comprise lithium, it may be preferable to form the conductive polymer layer first on another foil, followed by lamination of the polymer coating with a lithium foil.

U.S. Pat. No. 4,569,734, incorporated herein in its entirety by reference, describes a process for preparing polypyrrole coatings and self-supporting foils. Polypyrroles are prepared by electrochemical polymerization of pyrrole alone or together with comonomers, in an aqueous electrolyte solvent. The process gives polypyrrole films which have good mechanical properties and high electrical conductivities. Such polypyrroles doped with a transition metal are described in U.S. Pat. No. 4,818,646 incorporated herein by reference in its entirety. Such coatings and foils are conveniently deposited on metal electrodes as a coating which electrode may later be used as the metal current collector. Alternatively, the film is deposited on a metal anode and then removed for application to a metal current collector.

Accordingly, films may be grown on an anode foil when pyrrole is oxidized electrochemically. The same is true for thiophene. It is probably advantageous, though not strictly necessary, to include conductive polymer dopant prior to assembly of the battery. Since both anions and cations are consumed during doping, it is necessary to make up any loss of electrolyte salt (Li+) if the conductive polymer is doped in situ. A method for forming highly electrical conductive copolymers of pyrroles which possess good mechanical properties is described in U.S. Pat. No. 4,640,749 which is incorporated herein by reference in its entirety. BASF, in Germany, manufactures and markets a pyrrole foil. It is thought to be prepared by the basic process as described in U.S. Patent Nos. 4,640,749 and 4,569,734, which are assigned to BASF and are incorporated herein by reference in their entirety. As described above, pyrroles are prepared by anodic polymerization in a polar solvent in the presence of a suitable conductive salt.

Similarly U.S. Pat. No. 4,987,042, assigned to BASF describes a method for forming polythiophenes and thiophenes polymerized with other polymerizible compounds to improve mechanical properties of the end product films without adversely affecting electrical properties. U.S. Pat. No. 4,987,042 is incorporated herein by reference in its entirety. Both chemical and electrochemical methods are described for forming such polythiophene polymers and copolymers. In the case of electrochemical methods, an electrolytic cell having a platinum anode and a solution containing an ethylene dioxythiophene is prepared and electrolysis is carried out for 4 hours at room temperature at a relatively constant current and 3.5 volts to form polythiophene deposited on the platinum anode in the form of a coating. Once electrolysis is completed, the coating may be washed and then removed from the platinum anode for subsequent application to a lithium anode or to a cathode current collector.

Figure 8:
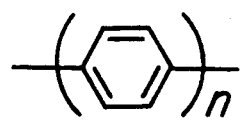

As described in U.S. Pat. No. 4,640,749, issued to BASF a polypyrrole (FIG. 6) and polyphenylene (FIG. 8) composite film may be formed electrochemically by using polyphenylene as an anode in a pyrrole solution.

In use in a cell or battery, lithium ions are transported along the main chain of the conductive polymer. At the same time, electrons are also conducted along such chains. As shown in FIG. 4, this is achieved through a conjugated polymer chain by shifting of double bonds.

While this invention has been described in terms of certain embodiments thereof, it is not intended that it be limited to the above description, but rather only to the extent set forth in the following claims.

The embodiments of the invention in which an exclusive property or privilege is claimed are defined in the appended claims.

We claim:

1. A battery comprising:
a) an electrolyte;
b) a positive electrode having an active material and comprising a current collector which has a major surface facing the active material; and
c) a layer between the major surface of the current collector and the electrolyte, said layer comprising a conductive polymer having single and double bonds alternating along a main polymer chain and being a conductor of electrons and capable of restricting penetration of one or more of electrolyte and active material therethrough.

2. The battery according to claim 1, wherein the conductive polymer is at least one selected from the group consisting of polyaniline, polypyrrole, polythiophene, polyphenylene and derivatives and mixtures thereof.

3. A battery according to claim 1 and further including a second layer like the first mentioned layer on a second surface of the current collector.

4. The battery according to claim 1, wherein the layer is a coating carried on the major surface of the current collector of the electrode.

5. In a battery having a lithium-containing negative electrode body, a positive electrode body containing an active material, an electrolyte separator in the form of a polymeric network containing an electrolyte solution comprising a metal salt of the negative electrode disposed between the negative and positive electrode bodies, and a current collector adjacent a surface of the positive electrode body remote from the electrolyte separator, the improvement comprising a layer between the current collector and the active material of the positive electrode, said layer comprising at least one conductive polymer having single and double bonds alternating along a main polymer chain and being a conductor of electrons and capable of restricting penetration of one or more of electrolyte and active material therethrough.

6. The improvement according to claim 5, wherein the at least one conductive polymer being selected from the group consisting of polyaniline, polypyrrole, polythiophene, polyphenylene and derivatives and mixtures thereof.

7. The improvement according to claim 5, wherein the layer is carried on a first surface of the current collector facing the positive electrode active material.

8. The improvement according to claim 7, wherein a second layer is carried on a second surface of the current collector opposite the first surface, such second layer having a composition similar to the first layer.

* * * * *